_United States Patent Office_

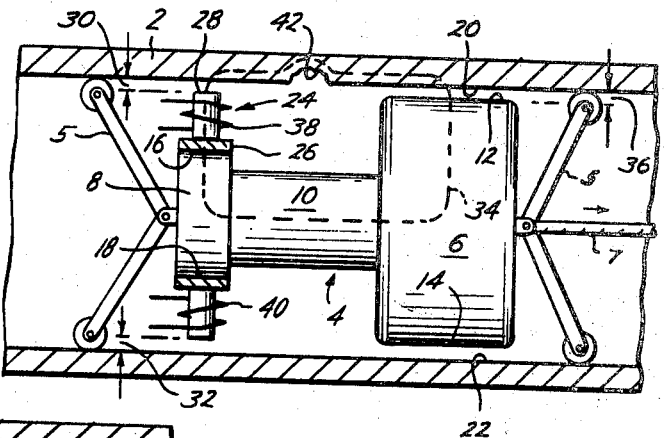
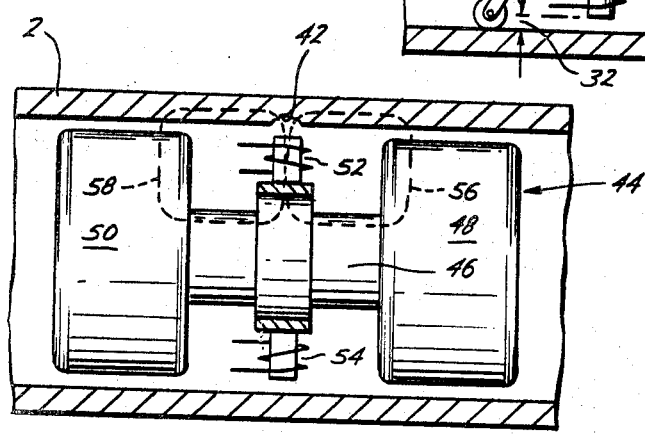
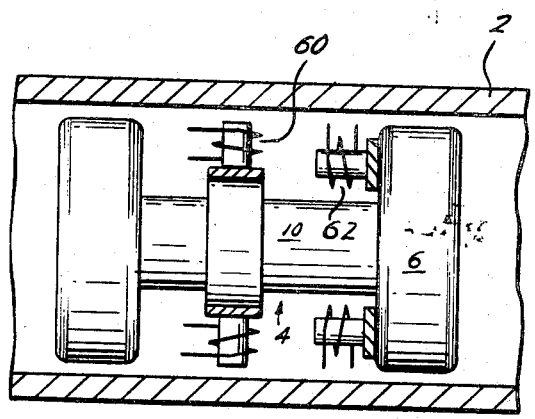
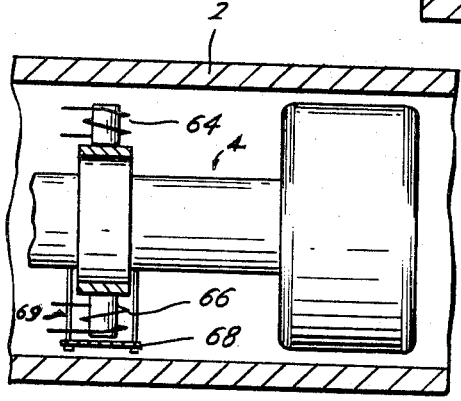
Fenton M. Wood
William T. Walters
INVENTORS

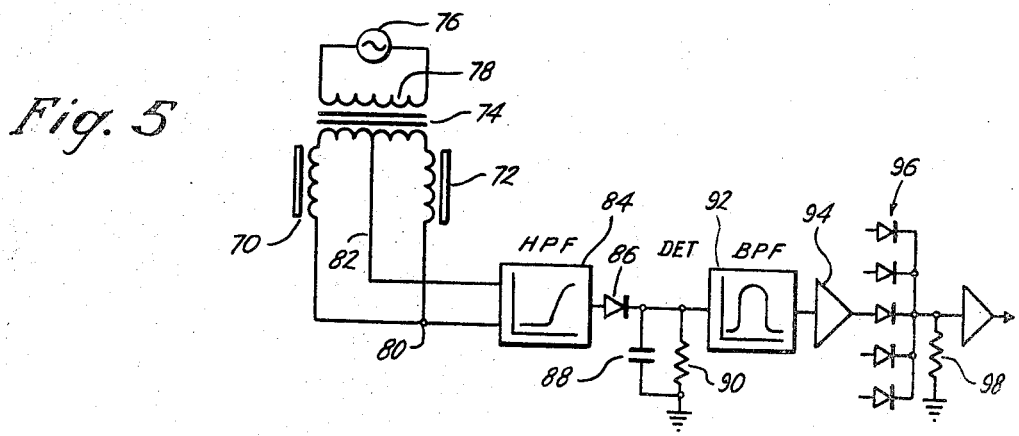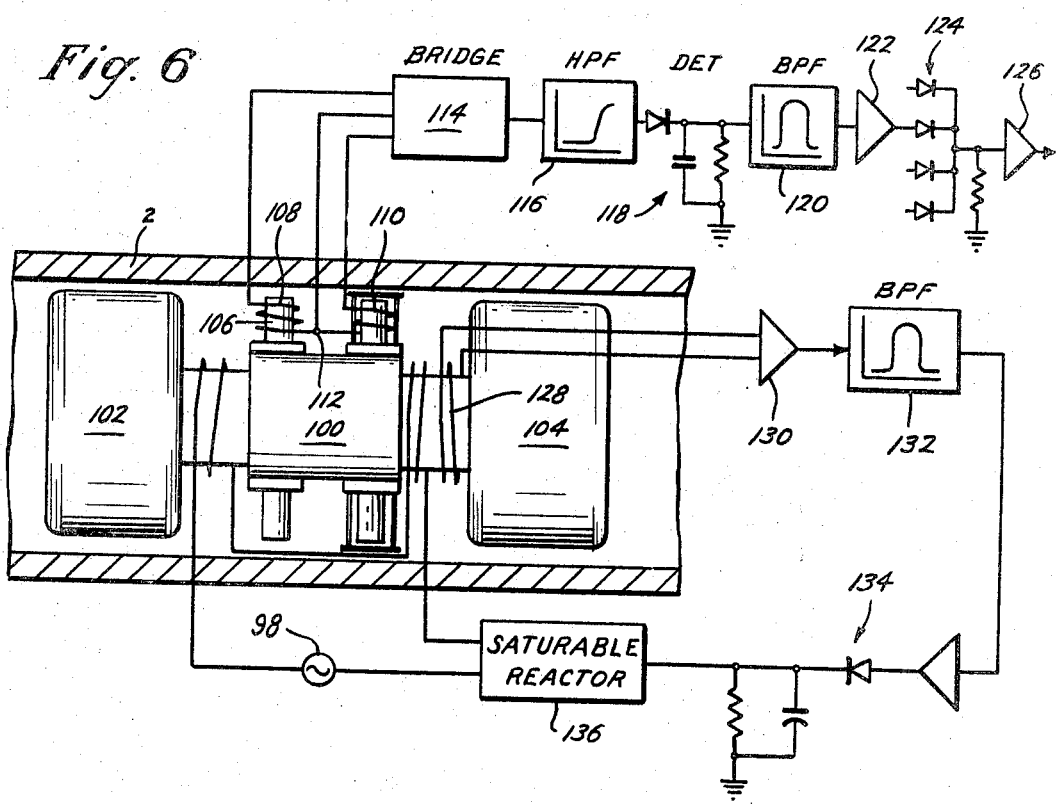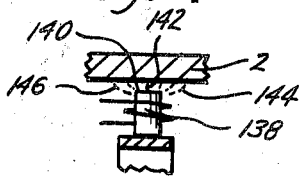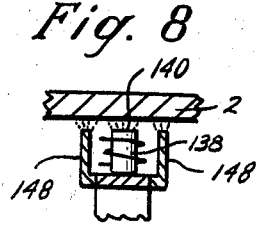

3,443,211
Patented May 6, 1969

3,443,211
MAGNETOMETER INSPECTION APPARATUS
FOR FERROMAGNETIC OBJECTS
Fenton M. Wood, Sugarland, and William T. Walters, Houston, Tex., assignors to American Machine and Foundry Company, New York, N.Y., a corporation of New Jersey
Filed Apr. 1, 1965, Ser. No. 444,739
Int. Cl. G01r 33/12
U.S. Cl. 324—37                                19 Claims

ABSTRACT OF THE DISCLOSURE

Apparatus for inspecting ferromagnetic objects using magnetometers on one pole of a magnetizer core having a larger pole. The magnetizer may be a permanent magnet or include an AC source. Shield may be provided for the magnetometers.

---

This invention relates to the magnetic inspection of ferromagnetic members, such as well pipe and the like, for surface anomalies, which may be caused by such things as corrosion, wear, or the like. More particularly, this invention is directed to a non-contacting caliper having no movable parts that may be pulled along the surface of an inspected member for conveniently detecting the presence of these anomalies and identifying other characteristics, such as depth, width and location of these anomalies.

Although the description of this equipment will be made with respect to inspecting the inside surface area of a tubular ferromagnetic pipe, it will be obvious that the invention may be practiced with equal success with respect to the outside surface of such pipe, flat members or any regular surface whether linear, convex or concave.

An important use for calipers of this type is in the testing of pipe used in the production of oil and gas for the presence and extent of internal surface depression. Heretofore, the most generally used devices have been those employing outwardly urged contact feelers riding the surface of the pipe. Such feelers not only often failed to recognize and identify surface depressions (particularly where paraffin or other caked accumulation builds up), but the feelers themselves tended to mar the pipe surface, or the insulation sometimes applied thereto.

Of the non-contacting variety of calipers, such as shown in Ownby 3,015,063, devices comprising moving parts have been employed. However, these types often prove highly unsuccessful in operating under high pressure and temperature conditions or when used in pipe containing corrosive liquids, such as salt water.

A full understanding of certain features in the operation of the present invention commands familiarity with the magnetometric detecting devices employed therein.

A magnetometer is a device that is quite sensitive to changes in magnetic flux densities. As more completely described in Vacquier 2,406,870, a magnetometer comprises a core, made of material (such as Mumetal or Permalloy) having high permeability and low energy requirements for saturation, and a sensing winding wound about the core. The hysteresis loop for such core exhibits an extremely sharp knee at saturation. This is important in using a magnetometer in a highly sensitive sensing device because so long as the core is maintained above saturation, the flux density in the core drops off extremely fast.

When used in pairs, this characteristic of the magnetometers may be used to advantage as a highly sensitive detector. In the device described and illustrated herein, pairs of magnetometers are connected so that each is a part of an essentially identical magnetic circuit. Each is energized simultaneously by a periodic current that drives the magnetometer cores past saturation. Because the reluctance paths of each of the two circuits are the same, on each magnetizing cycle, the knees of the curves on the two hysteresis loops are reached virtually simultaneously.

When one of the magnetic paths changes, causing the reluctance of the path to change, however, the saturation point of the two curves are not arrived at coincidentally, but rather one is arrived at before the other, thus unbalancing the bridge in which the windings of the magnetometers are connected for a very short period of time.

When there is a change in one magnetic reluctance path causing the hysteresis characteristic curve of one core to shift in time, or phase, with respect to the other, there will be a resultant net detectable voltage for a period of time, such voltage representative of the difference in the individual voltages. Because operation is at the sharply vertical portion of the curve, the detectable voltage is in the form of a relatively sharp spike with respect to the period of the current driving the magnetometers.

The structures employing the present invention insure that the only variable reluctance value in each megnetometer circuit path is the air gap between the magnetometer core and the surface of the inspected member. When no-depression condition exists, this air gap dimension is constant. On the other hand, when one magnetometer is positioned opposite a depression, the gap dimension increases, changing the path reluctance. The characteristic curve of the magnetometer in this circuit shifts, as described above. The characteristic curve of the other magnetometer, the coil of which is connected in opposition with the coil of the first, does not shift in phase since its reluctance path remains constant. Therefore, a spiked net voltage is produced.

As is readily apparent, this resultant voltage is dependent on the depth and width of the depression, each of which has an effect on the reluctance path. From a study of these voltage shapes, it is possible to obtain information therefrom so that depth and width information can be recognized from the shape of the resulting voltage pulses. Similarly, it is possible to determine the longitudinal position in the pipe where the sensing magnetometer is located at the time a depression is detected. One convenient method may be through the use of a recording tape driven at a rate relative to the driving speed, or scanning rate, of the magnetometers. This allows the depression anomaly to be isolated for repair or replacement.

As will be described more fully below, either DC or AC magnetization is possible and the magnetometer energizing current may be any convenient frequency compatible with the magnetizing frequency (if AC magnetization is employed) and the scan rate.

A feature of the example structure described and illustrated herein is a novel device for concentrating flux opposite the sensing magnetometer, thereby improving the resolution of the flux pattern. Therefore, one embodiment of this invention for detecting depressions in a ferromagnetic material when scanned past the surface thereof as illustrated comprises Magnetic means, which may be either a permanent magnet in which one pole piece surface area is substantially greater than the other pole piece area or which may be an AC magnet or similar structure and energized by a low frequency AC signal;

A pair of magnetometer cores of high permeability material affixed to the pole piece of lesser surface area and spaced apart from each other, said cores being included in magnetic circuits closely matched with respect to magnetic properties;

Positioning means for locating said magnetic means spaced apart from the ferromagnetic material such that at least one of said cores is separated from the surface of the ferromagnetic material by an air gap, said core being the sensing core;

Said magnetic means establishing lines of magnetic flux through a path comprising said magnetic means, said sensing core, said air gap opposite said core, the ferromagnetic material located between and opposite said core and said greater area pole piece of said magnetic means, and the air gap between the ferromagnetic material and said greater area pole piece, the reluctance of said first named air gap establishing the flux density limit for the path of magnetic flux;

Said magnetic means establishing lines of magnetic flux through a similar path comprising the other magnetometer core; and Detection means attached to said cores for indicating a change in the difference of magnetic flux when said sensing core is positioned opposite a depression in the ferromagnetic material, thereby increasing the air gap opposite said core and the reluctance of the associated magnetic path.

An additional structure shown to be beneficial in combination with a device utilizing a detecting means comprising a magnetometer core which is disposed adjacent to, but separated from, a surface to be inspected and through which a flux has been established, is the improvement comprising A shield of magnetizable material at least partially surrounding said magnetometer core and disposed close thereto such that magnetic lines of flux are established in said shield parallel to the lines of flux in said magnetometer core such as to confine the lines of flux from said magnetometer core, thereby improving the resolution of the flux pattern by preventing stray flux from emanating other than essentially through the face disposed opposite the inspected surface.

More particular description of the invention may be had by reference to the embodiments thereof which are illustrated in the appended drawings, which form a part of this specification. It is to be noted however, that the appended drawings illustrate only typical embodiments of the invention and therefore are not to be considered limiting of its scope, for the invention will admit to other equally effective embodiments.

In the drawings:

FIG. 1 is a cross-sectional view of the length of pipe having disposed therein an inspection apparatus in accordance with one embodiment of this invention.

FIG. 2 is a cross-sectional view of a length of pipe having disposed therein an inspection apparatus in accordance with another embodiment of this invention.

FIG. 3 is a partial cross-sectional view, showing an alternate arrangement for a portion of one embodiment of this invention.

FIG. 4 is a partial cross-sectional view, showing another alternate arrangement for a portion of one embodiment of this invention.

FIG. 5 is a diagram, partly in block diagram form and partly in schematic form, showing a method for electrically connecting the embodiments shown in FIGS. 1, 2, 3 and 4.

FIG. 6 is a cross-sectional view of a length of pipe having disposed therein an apparatus in accordance with yet another embodiment of this invention, together with an electrical connection diagram.

FIG. 7 is a partial cross-sectional view, showing flux conditions at the end of a typical magnetometer.

FIG. 8 is a partial cross-sectional view, showing a structure for improving the flux conditions at the end of a typical magnetometer.

Referring to the drawings in detail, and first to FIG. 1, a ferromagnetic tubular pipe 2 is shown in cross-section surrounding a simplified apparatus 4 employing the invention. Apparatus 4 generally comprises a magnetizing portion and a sensing portion. The magnetizing portion may be a permanent magnet having a south pole piece 6, a north pole piece 8, and a connecting armature 10, fixedly attached between the south and north pole pieces.

The south pole piece 6 is of considerably larger volume than north pole piece 8, presenting upper and lower surface edges 12 and 14 which are considerably greater in surface area than upper and lower north pole piece edges 16 and 18.

Apparatus 4 is positioned and held along the center axis of pipe 2 by centering device 5 such that edge 12 is spaced the same distance from adjacent inside surface 20 of pipe 2 as edge 14 is from adjacent inside surface 22. Similarly, edge 16 of north pole piece 8 is spaced the same distance from adjacent inside surface 20 as edge 18 is from adjacent inside surface 22.

The centering device that accomplishes this equal-distance spacing of apparatus 4 may be of any convenient structure. However, one convenient structure 5 that may be used is a carriage having spatially disposed rollers outwardly urging against the inside surface of pipe 2. The equal-distance spacing may also be accomplished by coating edges 12 and 14 of south pole piece 6 with resilient, non-magnetic material. Apparatus 4 may be pulled by a device such as a cable 7 so that the area of internal surface of pipe 2 can be scanned.

The sensing portion of apparatus 4 may conveniently take the form of magnetometer sensing devices 24 secured to north pole piece 8 via ferromagnetic ring 26. This ring may be merely press fit onto pole piece 8 or cemented by some convenient means known in the art. The magnetometer cores 28 may be connected to ring 26 by shrink fitting holes in ring 26 around the cores or by any other convenient means.

As shown, magnetometer 24 are disposed to project radially from ferromagnetic ring 26, one being located approximately 180 mechanical degrees around the axis of the pipe 2 from the other. It should be noted that, although this arrangement may be preferred, any convenient disposition may be made such that the magnetometers are separated sufficiently so that they do not scan the same surface of the pipe at the same time.

The magnetometer cores 28 are of high permeability material, such as Mumetal, or Permalloy, and are made equal in length so as to provide an air gap 30 which is equal to air gap 32.

It may now be seen that one entire magnetic flux path 34 may be traced starting at armature 10, through the upper portion of pole piece 8, through ferromagnetic ring 26, through core 28, through air gap 30, through the pipe 2 which is being inspected, through air gap 36 between pipe 2 and upper edge 12 of south pole piece 6, through the upper portion of pole piece 6, and back to armature 10. A similar flux path, of course, is established through the lower magnetometer and the lower portions of the pole pieces 6 and 8.

Wound about each magnetometer core is an essentially identical coil winding. Around the upper core is coil 38 and around the lower core is coil 40. The same periodic current is then applied to coils 38 and 40; however, electrically the phase of the applied energizing current to coil 38 is 180 degrees from the current applied to coil 40. The amplitude of this energizing current is sufficient to drive cores 28 through the region of magnetic saturation, or above the knee of their respective hysteresis characteristic curves.

The operation of the above described structure may be understood best by considering the conditions as they exist with the apparatus 4 positioned as it appears in FIG. 1, viz with internal pipe depression spaced longitudinally some distance from magnetometer core 28. The reluctance path of 34 and the corresponding reluctance path through the lower portion of the structure are essentially identical, in that they each comprise essentially identical components. Therefore, AC periodic current applied to coils 38 and 40 will result in essentially identical voltages being developed across said coils. By connecting the two coils in opposition (so that the developed voltages oppose one another), the voltages will exactly cancel one another with a resultant net voltage of zero.

Now consider the arrangement wherein apparatus 4 has moved to the right with respect to pipe 2 so that magnetometer core is now directly in line with depression 42. The reluctance path established in the lower half of the structure remains the same as it did when apparatus 4 was still in the previous position. However, the upper reluctance path 34 now has a larger value. Air gap 30 is no longer the distance between the end of magnetometer core 28 and the relatively straight internal surface 20, but is rather the distance between end 28 and the further removed surface of depression 42, making an overall air gap which is significantly larger than the original air gap 30.

This increase of reluctance in the upper path causes the saturation point of upper magnetometer core 28 to occur at a slightly later time than the saturation point of the lower magnetometer core. A voltage indicator connected to indicate the resultant voltage will now register a voltage for a short period of time indicating that the depression is being sensed. This voltage will be somewhat spiked in appearance, the exact characteristics being dependent on the depth and width of depression 42.

FIG. 2 shows an alternate structure to that shown in FIG. 1 wherein depression-sensing scanning apparatus 44 comprises one additional significant feature, a second south pole piece. Generally speaking, apparatus 44 comprises an armature 46, a south pole piece 48, an essentially identical south pole piece 50, north pole portion 52 and north pole portion 54. As shown, armature 46 joins south pole pieces 48 and 50, preferably as one continuous piece and north pole portions 52 and 54 extend therefrom at a position that is essentially mid-way between the two south pole pieces. Similar to the structure shown in FIG. 1, substantially identical magnetometers are connected to the north pole portions via a ferromagnetic ring.

Apparatus 44 is positioned within the confines of pipe 2 such that the south pole pieces are spaced apart along the longitudinal axis of the pipe, with the north pole portions radially extending therefrom. The upper and lower edges of pole piece 48 are separated by equal air gap amounts from the internal surface of the pipe located adjacent thereto, as it usually appears without a depression therein. Likewise, the upper and lower edges of pole piece 50 are separated by equal air gap amounts from the internal surface of the pipe located adjacent thereto. Also, the magnetometer cores connected to the north pole portions are positioned so that their outward edges are separated by equal air gap amounts from the internal surface of the pipe adjacent thereto.

The device used to maintain this spacing and to move apparatus with respect to the pipe surface may be any convenient means, such as that discussed with respect to the FIG. 1 structure.

It is now apparent that there are now four basic flux paths, two, 56 and 58 through the upper portion of the south pole pieces 48 and 50 and two through the lower portion of these pole pieces. Flux paths 56 and 58 both pass through a portion of the upper magnetometer core attached to the north portion 52.

As stated above, ideally apparatus 44 is spaced so that the pole edges are all normally spaced the same distance from the internal surface of pipe 2. But should apparatus 44 tilt slightly so that the upper edge of pole piece 48 becomes closer to the internal surface of pipe 2 than to the upper edge of pole piece 50, then the total flux through the magnetometer core still remains essentially constant. This is because one reluctance path increases in value while the other reluctance path decreases in value, with a resultant net change of approximately zero.

However, should a depression be sensed by one of the magnetometers connected to a north pole portion, the operation is essentially identical to that described for the structure shown in FIG. 1. This is because the reluctance of the combined paths through one north pole portion (the one opposite the depression) will be affected, whereas the reluctance of the combined paths through the other north pole portion will not be affected.

It should be noted that in both the FIG. 1 and FIG. 2 structures the upper and the lower magnetometers act as sensing devices. Therefore, should depressions simultaneously be located opposite each magnetometer, and should these depressions be similar in dimension than there would be a resultant net indication of zero even though there were depressions on the inside surface of the pipe. The situation described above is highly unlikely; however, the erroneous indication may be avoided by using a structure such as that shown in FIG. 3 or FIG. 4.

The FIG. 3 structure may be considered as similar to the FIG. 2 structure; however, only magnetometer 60 is used as a sensing magnetometer. The magnetometer connected in opposition therewith is magnetometer 62, placed at a 90° mechanical angle to that of magnetometer 60, fixedly secured to the same central magnetic core apparatus 4 by any convenient position. One convenient position may be on the enlarged portion of south pole piece 6 close to armature 10. Positioning of magnetometer 62 in this manner makes it become insensitive to depressions in the internal surface of pipe 2.

In some instances, it may be more convenient to make a magnetometer become insensitive by a connection such as shown in FIG. 4. In this arrangement, magnetometer 64 is the sensing magnetometer and magnetometer 66 is the insensitive magnetometer. Magnetometer 66 is shown disposed at the same radial mechanical angle with respect to the pipe surface as magnetometer 64; however, a shield 68, made of some magnetic shielding material such as iron, is placed between magnetometer 66 and the internal surface of pipe 2. Again, as in FIGS. 1 and 2, magnetometer 66 is shown positioned 180 degrees axially from magnetometer 64, although any convenient angle may be selected. Shield 68 may be attached to the entire apparatus via any convenient means, such as stand-offs 69 joined to the central apparatus 4.

It should be noted that if the FIG. 3 and the FIG. 4 embodiments are used, then the reluctance paths become a bit more complex since they do not physically comprise essentially identical elements in all cases. This necessitates a fine adjustment to insure normal balance between the two magnetometers and their associated magnetic circuits.

A typical operating electrical circuit that may be used in connection with a pair of magnetometers mechanically connected as described above is shown in FIG. 5. The two magnetometers that are used for sensing, either one or both of which may be actually subjected to changes in magnetic reluctance path variations, are shown as magnetometer coils 70 and 72. Each of these two magnetometers has one end connected to opposite ends of secondary coil 74 of a transformer. The primary coil 78 is connected to oscillator 76, thereby providing the means used for exciting magnetometer coils 70 and 72 in accordance with the above description.

The other end of magnetometer coil 70 from that which is connected to transformer secondary 74 and the other end of magnetometer coil 72 from that which is connected to transformer secondary 74 are joined at junction point 80. Center tap 82 of secondary coil 74 is connected to one input terminal of high pass filter 84, whereas junction point 80 is connected to the other input terminal of the high pass filter 84. As is readily apparent, this connection satisfies the condition of magnetometer coil 70 being in series opposition (voltage phase separation of 180 degrees) with magnetometer coil 72, since they derive their energizing voltages from different halves of the transformer secondary 74.

Under typical operating conditions, the oscillator frequency may be set at 1,000 cycles per second, resulting in spiked depression sensing pulses on the order of much higher frequency and including many high frequency harmonics because of the lack of magnetometer canceling action described above.

The output from high pass filter 84 is applied to a detector-integrator circuit comprising diode 86, capacitor 88 and resistor 90. The output from filter 84 is applied to the anode of diode 86. Capacitor 88 and resistor 90 are connected in parallel, one end of the combination being connected to the cathode of diode 86 and the other end of the combination being connected to ground. The circuit comprising capacitor 88 and resistor 90, having a short enough time decay response not to deteriorate the signal, smooths out the incoming pulses from the high pass filters, so that the resultant output from the cathode of diode 86 is spread to effectively produce an envelope.

It should be noted that the amplitude and length of the resultant envelope varies as the depth and the duration of the sensed depression varies. A study of these resultant envelope voltage shapes reveals that an increase in depression depth causes an increase in amplitude and an increase in the area covered by the depression (duration) causes an increase in the length of the envelope.

The output from the detector-integrator is applied to band pass filter 92. At the lower end filter 92 filters out unwanted low frequency components obviously not resulting from depressions and any DC component that may exist and, at the upper end, filter 92 filters out the high frequency circuit noise that may exist above the signal band. Hence, only the envelope frequencies are passed to subsequent stages of the circuit.

The output from filter 92 may be connected to amplifier 94, to provide a stage of amplification if required. The signal is then applied to one of the inputs to an OR circuit 96 comprised of a plurality of diodes joined together at their cathodes and having resistor 98 connected between the common cathode point and ground.

The output from the OR circuit is normally applied to either a utilization circuit or a recorder, commonly in the form of a strip chart recorder having a recording strip moving at a rate that is directly related to the rate the apparatus is moved along the surface of pipe 2. A magnetic tape or wire recorder may also be used for this purpose.

The above description has assumed that the magnetometer cores are attached to the north pole portions. It is readily apparent that the north and south pole designations may be interchanged without changing the operation of the device.

In addition to a DC magnetizing means, such as a permanent magnet shown in FIGS. 1 and 2, an AC magnetizing means may be used. In the discussion of the AC magnetizing means described below, the terminology "north" and "south" pole or pole portion is retained for convenience of correlating the AC structures with the DC structures described above. Of course, because of AC magnetization, the poles are actually alternately magnetized first in one direction and then in the other.

One convenient embodiment may be in the structure shown in FIG. 6, wherein an AC magnetizing means is shown comprising oscillator 98, magnetizing core 100, south pole pieces 102 and 104, and north pole piece 106.

As shown, the magnetizing apparatus comprises substantially identical south pole pieces 102 and 104, large enough in transverse dimension to span a substantial portion of the inside diameter of pipe 2. The south pole pieces are connected by armature 100 of substantially reduced transverse dimension compared with the south pole pieces. North pole portions 106 radially extend from armature 100 at a point substantially longitudinally midway between the south pole pieces. The entire apparatus is maintained a standard distance from the internal pipe surface as it scans the surface. Oscillator 98 is connected to magnetizing core 100 via connecting wires wound about the core to provide the necessary magnetization current.

Sensing magnetometer 108 and balancing magnetometer 110 are similar in construction to that shown in FIGS. 2 and 4 and are connected to north pole portions 106 by a ferromagnetic ring, similar to that shown in FIG. 2.

The connections shown in FIG. 6 allow the same oscillator 98 to provide magnetization of the segment of pipe 2 between pole pieces 102 and 104 and to excite the magnetometer cores through saturation so that they may act as sensing devices.

The coil of magnetometer 108 is connected to the coil of magnetometer 110 at junction point 112 which point is applied to one of three input terminals to bridge circuit 114. The other two inputs of the circuit 114 are connected to the ends of the coils of magnetometer 108 and 110 opposite those connected to junction point 112. The bridge circuit may include the input impedance of a differential amplifier for providing a balanced amplified output of the magnetic circuit. The bridge is balanced when the magnetometer cores are both in neutral positions (when the sensing magnetometer is not opposite a depression in the surface of the pipe), and hence, when their saturation curves are essentially identical. Therefore, when a depression comes opposite the sensing magnetometer core, a spiked voltage occurs. To correct for initial imbalance during setup, it is permissible to merely change the number of turns on one core with respect to the number of turns on the other.

This voltage is applied successively to high pass filter 116, detector-integrator 118, band pass filter 120, amplifier 122, OR circuit 124, and amplifier 126. At each stage the voltage is acted upon and shaped as described above for the FIG. 5 circuit. The output from amplifier 126 is subsequently applied to a utilizing circuit or recorder, which may be in the form of a strip chart, a wire recorder or a tape recorder, as with the output of the FIG. 5 circuit.

It is possible with the AC magnetization circuit to employ a compensating circuit through an additional winding wound about magnetizing armature 100. This winding 128 may be connected to an amplifier 130, which may be in turn connected to band pass filter 132, which may then be connected to a detector-integrator circuit 134 through an amplifier stage. The output from detector-integrator 134 may be connected to the voltage control coil of a saturable reactor, one of the alternating current reactance coils of which may be connected to oscillator 98 and the other of which may be connected to the winding of the oscillator circuit which is wound about core 100.

The saturable reactor provides means for controlling the exciting current from oscillator 98 to compensate for residual magnetism and variations in magnetic permeability caused by such things as changes in heat-treating conditions, changes in the hardness of pipe wall encountered, gradual changes in the internal diameter of the pipe and and other things that would normally cause a change in the calibration of the equipment. The inclusion of a saturable reactor automatically adjusts the magnetizing current to maintain a relatively constant magnetic flux in core 100.

The FIG. 7 and FIG. 8 structures show a significant improvement in maintaining reliably constant flux density measurements through the magnetometer cores. The FIG. 7 structure shows the normal conditions without the improvements whereby the magnetometer core 138 is shown having a squared end 140. Multiple flux paths are shown by the dotted lines between the end 140 and pipe 2. The flux pattern 142 at the center of end 140 is essentially perpendicular to pipe 2.

However, progressing away from the center of the flux pattern, it is seen that the pattern becomes less and less perpendicular, arching in a bowing manner. The length of such bowed patterns are indeterminate and unreliable, particularly at the extremities 144 and 146 of the pattern.

To correct for this indeterminateness, a shield such as a cylindrical shield 148 of high permeability material may be placed about magnetometer core 138. This shield 148 will have the magnetic flux established in it as with the magnetometer core, flux passing in free air between the ends of the shield and the internal surface of pipe 2. It is axiomatic that lines of flux emanating from a common source cannot cross one another; therefore, the lines of flux emanating from shield 148 have a tendency to restrict the lines of flux emanating from magnetic core 138 to those that are nearly perpendicular. This may be referred to as improving the resolution of the flux pattern.

Since shield 148 is not in the sensing circuit, it in no way interferes with the reluctance paths which includes magnetometer cores; however, by preventing flux leakage at the edges of the end piece 140 it increases the reliability of the prediction of the reluctance path of which the magnetometer core is a part, especially increasing the efficiency of detecting small depressions.

Operation of sensing magnetometers in accordance with the invention disclosed herein maintains flux density through the wall of pipe 2 at a level considerably below that of saturation, thereby avoiding large energizing sources, and the problems of heating pipe, thereby changing the physical properties of the structure of the pipe.

It should also be recognized that a series of magnetometer pairs may be used encircling the inspecting apparatus and jointly covering virtually the entire internal surface area of the pipe being inspected. The output from each pair then may be applied to a different input to an OR gate, such as OR gate 96 shown in FIG. 5. The apparatus may then be pulled longitudinally without rotation without fear of failing to detect a depression located anywhere on the internal pipe surface. When a depression appears opposite any sensing magnetometer, an output will result to the utilizing or recording device, as discussed above.

What is claimed is:

1. An apparatus for sensing depressions in a ferromagnetic member when scanned past the surface thereof, comprising
   (a) permanent magnetic means having one pole with a surface substantially greater than the total area of the opposite pole surface;
   (b) a pair of magnetometer cores of high permeability material affixed to the lesser of the two pole surface areas, said cores being included in magnetic circuit paths which are generally of corresponding shapes, sizes and materials, and thus are closely matched with respect to magnetic properties; AC excitation means associated with the cores and having a magnitude sufficient to drive the cores into saturation;
   (c) means for positioning said magnetic means so that the magnetic means is spaced apart from the ferromagnetic member such that at least the first of said cores is separated from the ferromagnetic member by an air gap to allow said first core to become a sensing core;
   (d) said magnetic means establishing lines of magnetic flux through a path comprising said magnetic means, said sensing core, said air gap opposite said core, the ferromagnetic member located between and opposite said core and said greater surface area pole of said magnetic means, and the air gap between the ferromagnetic member and the greater surface area pole, the reluctance of said first named air gap establishing the flux density limit for the magnetic flux path;
   (e) said magnetic means establishing substantially equal flux densities through said cores;
   (f) detection means coupled to said magnetometer cores for indicating a change in the difference of magnetic flux when said sensing core is positioned opposite a depression in the ferromagnetic member, thereby increasing the air gap opposite said core and the reluctance of the associated magnetic flux path.

2. An apparatus in accordance with claim 1, wherein a shield of magnetizable material surrounds each of said magnetometer cores and disposed close thereto, each shield providing a magnetic path parallel to the magnetometer core, the air gap between the pole tip of the shield generally surrounding the pole tip of the magnetometer core, such that magnetic lines of flux are established in said magnetometer core such as to confine the lines of flux from said magnetometer core to improve resolution of the flux pattern by preventing stray flux from emanating other than essentially through the face disposed opposite the inspected surface.

3. The apparatus of claim 1 in which, substitutionally, for paragraph (a);
   (a) magnetic means having one pole with a surface area substantially greater than the total area of the opposite pole surface.

4. An apparatus for sensing depressions in a ferromagnetic member when scanned past the surface thereof, comprising
   (a) permanent magnetic means having one pole with a surface area substantially greater than the total area of the opposite pole surface;
   (b) a pair of magnetometer cores of high permeability material affixed to the lesser of the two pole surface areas, said cores being included in magnetic circuit paths which are generally of corresponding shapes, sizes and materials, and thus are closely matched with respect to magnetic properties; AC excitation means associated with the cores and having a magnitude sufficient to drive the cores into saturation;
   (c) means for positioning said magnetic means so that the magnetic means is spaced apart from the ferromagnetic member such that said cores are each separated from the ferromagnetic member by substantially equal air gaps;
   (d) said magnetic means establishing lines of magnetic flux through each magnetometer core via substantially equal paths, each path comprising said magnetic means, one of said cores, said air gap opposite said core, the ferromagnetic member located between and opposite said core and said greater surface area pole of said magnetic means, and the air gap between the ferromagnetic member and the greater surface area pole, the reluctance of said first named air gap establishing the flux density limit for the magnetic flux path; and
   (e) detection means coupled to said cores for indicating a change in the difference of magnetic flux when either of said cores is positioned opposite a depression in the ferromagnetic member, thereby increasing the air gap opposite said core and the reluctance of the associated magnetic flux path.

5. The apparatus of claim 4 in which, substitutionally, for paragraph (a);
   (a) magnetic means having one pole with a surface area substantially greater than the total area of the opposite pole surface.

6. The apparatus of claim 5, wherein one of said magnetometer cores is oriented so that it is isolated from the surface of the ferromagnetic member.

7. The apparatus of claim 5, and including
   (a) shielding means connected to the apparatus for isolating one of said magnetometer cores from the surface of the ferromagnetic member.

8. Apparatus in accordance with claim 4, said detection means comprising
   (a) a first coil surrounding one of said magentometer cores;
   (b) a second coil surrounding the other of said magnetometer cores;
   (c) said first and second coils being connected in series opposition;
   (d) an AC oscillator circuit connected across said series combination of said first and second coils, said voltage from said circuit being of sufficient amplitude to drive said magnetometer cores into saturation on successive cycle excursions, the time for reaching saturation being equal for each magnetometer when the reluctance of the associated magnetic flux paths are equal thereby producing an output from said series combination of zero, a pulse being produced when the excursion times are different caused by a relative change in the reluctance of the magnetic paths as varied by a change in an air gap opposite one core compared with the air gap opposite the other core; and (e) indicating means activated by said pulses, the amplitude of said pulses being a measure of depression depth and the number of said pulses being a measure of depression width.

9. An apparatus in accordance with claim 8, and including (a) at least one additional pair of magnetometer cores affixed to said lesser surface pole spaced apart from said first pair of cores and operating similar to said first pair of cores;

(b) said detection means additionally including
a third coil surrounding one of said magnetometer cores of said second pair,
a fourth coil surrounding the other of said magnetometer cores of said second pair,
said third and fourth coils being connected in series opposition,
said AC oscillator circuit being connected across said third and fourth coils similar to the connection with respect to said first and second coils;

(c) said indicating means additionally including
OR circuit means activated by said pulse produced from said series combination of said first and second coils and by a pulse from said series combination of said third and fourth coils.

10. An apparatus for sensing depressions in a ferromagnetic member when scanned past the surface thereof, comprising (a) AC magnetic means including
an armature,
a first and a second pole each connected to said armature, one pole having a surface area substantially greater than the total area of the opposite pole surface, and
a coil surrounding said armature energized by a low frequency AC signal;

(b) a pair of magnetometer cores of high permeability material affixed to the lesser of the two pole surface areas, said cores being included in magnetic circuit paths which are generally of corresponding shapes, sizes and materials, and thus are closely matched with respect to magentic properties; AC excitation means associated with the cores and having a magnitude sufficient to drive the cores into saturation;

(c) means for positioning said magnetic means so that the magnetic means is spaced apart from the ferromagnetic member such that at least the first of said cores is separated from the ferromagnetic member by an air gap to allow said first core to become a sensing core;

(d) said magnetic means establishing lines of magnetic flux through a path comprising said magentic means, said sensing core, said air gap opposite said core, the ferromagnetic member located between and opposite said core and said greater surface area pole of said magnetic means, and the air gap between the ferromagnetic member and the greater surface area pole, the reluctance of said first named air gap establishing the flux density limit for the magnetic flux path;

(e) said magnetic means establishing lines of magnetic flux through a path of substantially equal reluctance comprising the other magentometer core; and (f) detection means coupled to said cores for indicating a change in the difference of magnetic flux when said sensing core is positioned opposite a depression in the ferromagnetic member, thereby increasing the air gap opposite said core and the reluctance of the associated magnetic flux path.

11. An apparatus for sensing depressions in a ferromagnetic member when scanned past the surface thereof, comprising (a) AC magnetic means including
an armature
a first and a second pole each connected to said armature, one pole having a surface area substantially greater than the total area of the opposite pole surface, and
a coil surrounding said armature energized by a low frequency AC signal;

(b) a pair of magnetometer cores of high permeability material affixed to the lesser of the two pole surface areas, said cores being included in magnetic circuit paths which are generally of corresponding shapes, sizes and materials, and thus are closely matched with respect to magnetic properties; AC excitation means associated with the cores and having a magnitude sufficient to drive the cores into saturation;

(c) means for positioning said magnetic means so that the magnetic means is spaced apart from the ferromagnetic member such that said cores are each separated from the ferromagnetic member by substantially equal air gaps;

(d) said magnetic means establishing lines of magnetic flux through each magnetometer core via substantially equal paths, each path comprising said magnetic means, one of said cores, said air gap opposite said core, the ferromagnetic member located between and opposite said core and said greater surface area pole, the reluctance of said first named air gap establishing the flux density limit for the magnetic flux path; and (e) detection means coupled to said cores for indicating a change in the difference of magnetic flux when either of said cores is positioned opposite a depression in the ferromagnetic member, thereby increasing the air gap opposite said core and the reluctance of the associated magnetic flux path.

12. The apparatus of claim 11, wherein one of said magnetometer cores is oriented so that it is isolated from the surface of the ferromagnetic member.

13. The apparatus of claim 11, and including
(a) shielding means connected to the apparatus for isolating one of said magnetometer cores from the surface of the ferromagnetic member.

14. Apparatus in accordance with claim 11, said detection means comprising (a) a first coil surrounding one of said magnetometer cores;

(b) a second coil surrounding the other of said magnetometer cores;

(c) said first and second coils being connected in series opposition;

(d) an A-C oscillator circuit connected across said series combination of said first and second coils, said voltage from said circuit being of sufficient amplitude to drive said magnetometer cores into saturation on successive cycle excursions, the time for reaching saturation being equal for each magnetometer when the reluctance of the associated magnetic flux paths are equal thereby producing an output from said series combination of zero, a pulse being produced when the excursion times are different caused by a relative change in the reluctance of the magnetic paths as varied by a change in an air gap opposite one core compared with the air gap opposite the other core; and (e) indicating means activated by said pulses, the amplitude of said pulses being a measure of depression depth and the number of said pulses being a measure of depression width.

15. An apparatus in accordance with claim 14, and including
   (a) at least one additional pair of magnetometer cores affixed to said lesser surface pole spaced apart from said first pair of cores and operating similar to said first pair of cores;
   (b) said detection means additionally including
      a third coil surrounding one of said magnetometer cores of said second pair,
      a fourth coil surrounding the other of said magnetometer cores of said second pair,
      said third and fourth coils being connected in series opposition,
      said A-C oscillator circuit being connected across said third and fourth coils similar to the connection with respect to said first and second coils;
   (c) said indicating means additionally including
      OR circuit means activated by said pulse produced from said series combination of said first and second coils and by a pulse from said series combination of said third and fourth coils.

16. An apparatus for detecting depressions in a ferromagnetic member, comprising
   (a) magnetic means comprising an armature, first pole piece, a second pole piece, a coil surrounding said armature and energized by a low frequency A-C signal, said first pole piece surface area being substantially greater than said second pole piece surface area;
   (b) a pair of magnetometer cores of high permeability material affixed to said second pole piece and spaced apart from each other, said cores being included in circuit paths closely matched with respect to magnetic properties;
   (c) means for positioning said magnetic means spaced apart from the ferromagnetic member such that each of said cores is separated from the surface of the ferromagnetic member by an air gap of the same amount,
   (d) said magnetic means for each of said cores establishing lines of magnetic flux through a path comprising said magnetic means, said core, said air gap opposite said core, the ferromagnetic member located between and opposite said core and said first pole piece of said magnetic means and the air gap between the ferromagnetic member and said first pole piece, the reluctance of said first named air gap establishing the flux density limit for the path of magnetic flux;
   (e) detection means attached to each of said cores for indicating a change of magnetic flux when one of said cores is positioned opposite a depression in the ferromagnetic member, thereby increasing the air gap opposite said core and the reluctance of the associated path of magnetic flux; and
   (f) means for moving the apparatus with respect to the ferromagnetic member at a substantially constant speed.

17. An apparatus in accordance with claim 16, and including
   (a) saturable reactor means connected to said magnetic means for maintaining approximately constant magnetic flux through the ferromagnetic member in the presence of uniform residual magnetism and variations in material structure of the member.

18. In combination with a device utilizing as a detecting means a magnetometer core which is disposed opposite a surface to be inspected and through which a flux has been established, the improvement comprising
   (a) a shield of magnetizable material surrounding said magnetometer core and disposed close thereto such that magnetic lines of flux are established in said shield parallel to the lines of flux in said magnetometer core such as to confine the lines of flux from said magnetometer core to improve resolution of the flux pattern by preventing stray flux from emanating other than essentially through the face disposed opposite the inspected surface.

19. In combination with a device utilizing as a detecting means a magnetometer core which is disposed opposite a surface to be inspected and through which a flux has been established, the improvement comprising
   (a) a shield of magnetizable material at least partially surrounding said magnetometer core and disposed close thereto such that magnetic lines of flux are established in said shield parallel to the lines of flux in said magnetometer core such as to confine the lines of flux from said magnetometer core to improve resolution of the flux pattern by preventing stray flux from emanating other than essentially through the face disposed opposite the inspected surface.

References Cited
UNITED STATES PATENTS

| | | | |
|---|---|---|---|
| 2,992,390 | 7/1961 | De Witte | 324—34.11 |
| 3,114,876 | 12/1963 | Schuster | 324—37 |
| 3,284,701 | 11/1966 | Kerbow | 324—37 |

RUDOLPH V. ROLINEC, *Primary Examiner.*

R. J. CORCORAN, *Assistant Examiner.*